(12) United States Patent
Wakabayashi et al.

(10) Patent No.: US 12,143,543 B2
(45) Date of Patent: *Nov. 12, 2024

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventors: Satoru Wakabayashi, Saitama (JP); Masahiro Terada, Saitama (JP); Taro Saito, Saitama (JP); Tetsuya Mizusawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,447

(22) Filed: Nov. 23, 2023

(65) Prior Publication Data
US 2024/0106941 A1 Mar. 28, 2024

Related U.S. Application Data

(63) Continuation of application No. 17/482,444, filed on Sep. 23, 2021, now Pat. No. 11,870,954, which is a (Continued)

(30) Foreign Application Priority Data

Mar. 28, 2019 (JP) ................. 2019-064785

(51) Int. Cl.
*H04N 1/00* (2006.01)
*G06T 1/00* (2006.01)
*H04L 67/01* (2022.01)

(52) U.S. Cl.
CPC ........... *H04N 1/00209* (2013.01); *G06T 1/00* (2013.01); *H04L 67/01* (2022.05)

(58) Field of Classification Search
None
See application file for complete search history.

(56) References Cited

U.S. PATENT DOCUMENTS

| 8,238,689 B2 * | 8/2012 | Inoue ................. H04N 1/00244 358/463 |
| 11,870,954 B2 * | 1/2024 | Wakabayashi ............ G06T 1/00 |

(Continued)

FOREIGN PATENT DOCUMENTS

| JP | 2002170110 | 6/2002 |
| JP | 2002334342 | 11/2002 |

(Continued)

OTHER PUBLICATIONS

"International Search Report (Form PCT/ISA/210) of PCT/JP2020/013465," mailed on Jun. 9, 2020, with English translation thereof, pp. 1-5.

(Continued)

*Primary Examiner* — Dov Popovici
(74) *Attorney, Agent, or Firm* — JCIPRNET

(57) ABSTRACT

Provided is an image processing apparatus that performs image processing on original image data, the apparatus including a communication transceiver that performs communication with a terminal, a memory that stores parameter information indicating a relationship between image processing-related information transmitted from the terminal and an image processing parameter, and a processor, in which the processor acquires the original image data from an image server that communicates with the image processing apparatus via the communication transceiver, performs the image processing on the original image data using the image processing parameter corresponding to the image processing-related information based on the parameter information, (Continued)

and transmits image data after the image processing to the terminal via the communication transceiver.

6 Claims, 3 Drawing Sheets

Related U.S. Application Data continuation of application No. PCT/JP2020/013465, filed on Mar. 25, 2020.

(56) References Cited

U.S. PATENT DOCUMENTS

| | | | |
|---|---|---|---|
| 2012/0081725 A1* | 4/2012 | Tsukamoto | G06T 11/001 358/1.9 |
| 2022/0070370 A1* | 3/2022 | Terada | H04N 5/91 |

FOREIGN PATENT DOCUMENTS

| | | |
|---|---|---|
| JP | 2004206341 | 7/2004 |
| JP | WO2008075745 | 4/2010 |
| JP | 2012133749 | 7/2012 |

OTHER PUBLICATIONS

"Written Opinion of the International Searching Authority (Form PCT/ISA/237)" of PCT/JP2020/013465, mailed on Jun. 9, 2020, with English translation thereof, pp. 1-10.

"Office Action of Japan Counterpart Application", issued on Nov. 1, 2022, with English translation thereof, pp. 1-5.

"Office Action of U.S. Appl. No. 17/482,444", issued on Apr. 26, 2023, pp. 1-25.

"Office Action of Japan Counterpart Application", issued on May 9, 2023, with English translation thereof, pp. 1-5.

\* cited by examiner

FIG. 3

FOR "VIVID" SETTING

| | FOR TERMINAL DISPLAY | FOR POSTER PRINTING | FOR PHOTO BOOK | FOR Web POSTING |
|---|---|---|---|---|
| 1920 × 1080 : SDR : ICC PROFILE A | ... | ... | ... | ... |
| 1920 × 1080 : SDR : ICC PROFILE B | ... | ... | ... | ... |
| 1920 × 1080 : HDR : ICC PROFILE A | ... | ... | ... | ... |
| 1920 × 1080 : HDR : ICC PROFILE B | ... | ... | ... | ... |
| 2048 × 1536 : SDR : ICC PROFILE A | ... | ... | ... | ... |
| 2048 × 1536 : SDR : ICC PROFILE B | ... | ... | ... | ... |
| 2048 × 1536 : HDR : ICC PROFILE A | ... | ... | ... | ... |
| 2048 × 1536 : HDR : ICC PROFILE B | ... | ... | ... | ... |
| 3840 × 2160 : SDR : ICC PROFILE A | ... | ... | ... | ... |
| 3840 × 2160 : SDR : ICC PROFILE B | ... | ... | ... | ... |
| 3840 × 2160 : HDR : ICC PROFILE A | ... | ... | ... | ... |
| 3840 × 2160 : HDR : ICC PROFILE B | ... | ... | ... | ... |
| 7680 × 4320 : SDR : ICC PROFILE A | ... | ... | ... | ... |
| 7680 × 4320 : SDR : ICC PROFILE B | ... | ... | ... | ... |
| 7680 × 4320 : HDR : ICC PROFILE A | ... | ... | ... | ... |
| 7680 × 4320 : HDR : ICC PROFILE B | ... | ... | ... | ... |

FOR "NORMAL" SETTING

| | FOR TERMINAL DISPLAY | FOR POSTER PRINTING | FOR PHOTO BOOK | FOR Web POSTING |
|---|---|---|---|---|
| 1920 × 1080 : SDR : ICC PROFILE A | ... | ... | ... | ... |
| 1920 × 1080 : SDR : ICC PROFILE B | ... | ... | ... | ... |
| 1920 × 1080 : HDR : ICC PROFILE A | ... | ... | ... | ... |
| 1920 × 1080 : HDR : ICC PROFILE B | ... | ... | ... | ... |
| 2048 × 1536 : SDR : ICC PROFILE A | ... | ... | ... | ... |
| 2048 × 1536 : SDR : ICC PROFILE B | ... | ... | ... | ... |
| 2048 × 1536 : HDR : ICC PROFILE A | ... | ... | ... | ... |
| 2048 × 1536 : HDR : ICC PROFILE B | ... | ... | ... | ... |
| 3840 × 2160 : SDR : ICC PROFILE A | ... | ... | ... | ... |
| 3840 × 2160 : SDR : ICC PROFILE B | ... | ... | ... | ... |
| 3840 × 2160 : HDR : ICC PROFILE A | ... | ... | ... | ... |
| 3840 × 2160 : HDR : ICC PROFILE B | ... | ... | ... | ... |
| 7680 × 4320 : SDR : ICC PROFILE A | ... | ... | ... | ... |
| 7680 × 4320 : SDR : ICC PROFILE B | ... | ... | ... | ... |
| 7680 × 4320 : HDR : ICC PROFILE A | ... | ... | ... | ... |
| 7680 × 4320 : HDR : ICC PROFILE B | ... | ... | ... | ... |

FOR "PALE" SETTING

| | FOR TERMINAL DISPLAY | FOR POSTER PRINTING | FOR PHOTO BOOK | FOR Web POSTING |
|---|---|---|---|---|
| 1920 × 1080 : SDR : ICC PROFILE A | ... | ... | ... | ... |
| 1920 × 1080 : SDR : ICC PROFILE B | ... | ... | ... | ... |
| 1920 × 1080 : HDR : ICC PROFILE A | ... | ... | ... | ... |
| 1920 × 1080 : HDR : ICC PROFILE B | ... | ... | ... | ... |
| 2048 × 1536 : SDR : ICC PROFILE A | ... | ... | ... | ... |
| 2048 × 1536 : SDR : ICC PROFILE B | ... | ... | ... | ... |
| 2048 × 1536 : HDR : ICC PROFILE A | ... | ... | ... | ... |
| 2048 × 1536 : HDR : ICC PROFILE B | ... | ... | ... | ... |
| 3840 × 2160 : SDR : ICC PROFILE A | ... | ... | ... | ... |
| 3840 × 2160 : SDR : ICC PROFILE B | ... | ... | ... | ... |
| 3840 × 2160 : HDR : ICC PROFILE A | ... | ... | ... | ... |
| 3840 × 2160 : HDR : ICC PROFILE B | ... | ... | ... | ... |
| 7680 × 4320 : SDR : ICC PROFILE A | ... | ... | ... | ... |
| 7680 × 4320 : SDR : ICC PROFILE B | ... | ... | ... | ... |
| 7680 × 4320 : HDR : ICC PROFILE A | ... | ... | ... | ... |
| 7680 × 4320 : HDR : ICC PROFILE B | ... | ... | ... | ... |

# IMAGE PROCESSING APPARATUS, IMAGE PROCESSING METHOD, AND IMAGE PROCESSING PROGRAM

CROSS-REFERENCE TO RELATED APPLICATIONS

This application is a continuation application of and claims the priority benefit of U.S. patent application Ser. No. 17/482,444, filed on Sep. 23, 2021. The U.S. patent application Ser. No. 17/482,444 is a continuation application of International Application No. PCT/JP2020/013465, filed Mar. 25, 2020, the disclosure of which is incorporated herein by reference in its entirety. Further, this application claims priority from Japanese Patent Application No. 2019-064785, filed Mar. 28, 2019, the disclosure of which is incorporated herein by reference in its entirety.

BACKGROUND OF THE INVENTION

1. Field of the Invention

The present disclosure relates to an image processing apparatus, an image processing method, and an image processing program.

2. Description of the Related Art

An image editing system has been proposed in which RAW image data is managed on a cloud, image processing is performed on the cloud based on an instruction from a terminal, and the image after the image processing is transmitted to the terminal (see JP2002-170110A and JP2008-75745A).

SUMMARY OF THE INVENTION

An object of the present disclosure is to provide an image processing apparatus, an image processing method, and an image processing program in which image processing can be requested with a simple operation.

An aspect of the present disclosure relates to an image processing apparatus that performs image processing on original image data, the apparatus comprising a communication transceiver that performs communication with a terminal, a memory that stores parameter information indicating a relationship between image processing-related information that includes terminal information which is information regarding the terminal transmitted from the terminal and an image processing parameter, and a processor, in which the processor acquires the original image data from an image server that communicates with the image processing apparatus via the communication transceiver, performs the image processing on the original image data using the image processing parameter corresponding to the image processing-related information based on the parameter information, and transmits image data after the image processing to the terminal via the communication transceiver.

It is preferable that in the image processing apparatus according to the above aspect, the image processing-related information include terminal information which is information regarding the terminal.

Further, it is preferable that in the image processing apparatus according to the above aspect, the image processing-related information include use information which is information regarding a use of an image.

Further, it is preferable that in the image processing apparatus according to the above aspect, the image processing-related information include setting information regarding the image processing.

Further, in the image processing apparatus according to the above aspect, the original image data may be RAW image data, and the image processing performed by the processor may include development treatment on the RAW image data.

Another aspect of the present disclosure relates to an image processing method of performing image processing on original image data, the method comprising a step of performing, by a communication transceiver of an image processing apparatus, with a terminal, a step of acquiring the original image data from an image server that communicates with the image processing apparatus via the communication transceiver, referring to parameter information indicating a relationship between the image processing-related information transmitted from the terminal and an image processing parameter and performing the image processing on the original image data using the image processing parameter corresponding to the image processing-related information based on the parameter information, and a step of performing control of transmitting image data after the image processing to the terminal.

Still another aspect of the present disclosure relates to an image processing program of performing image processing on original image data, the program causing a computer to execute a step of performing, by a communication transceiver of an image processing apparatus, communication with a terminal, a step of acquiring the original image data from an image server that communicates with the image processing apparatus via the communication transceiver, referring to parameter information indicating a relationship between the image processing-related information transmitted from the terminal and an image processing parameter and performing the image processing on the original image data using the image processing parameter corresponding to the image processing-related information based on the parameter information, and a step of performing control of transmitting image data after the image processing to the terminal.

According to the present disclosure, it is possible to provide the image processing apparatus, the image processing method, and the image processing program in which image processing can be requested with a simple operation.

BRIEF DESCRIPTION OF THE DRAWINGS

FIG. 3 is an explanatory diagram of parameter information handled by the image processing apparatus in the image editing system.

DESCRIPTION OF THE PREFERRED EMBODIMENTS

Figure 1:
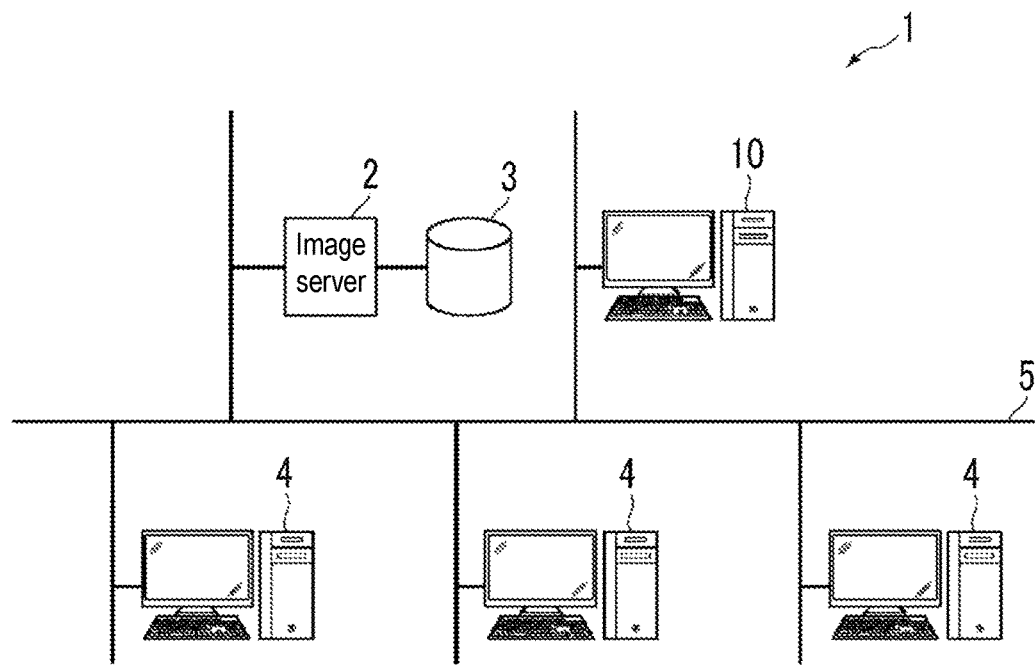
FIG. 1 is a diagram showing a schematic configuration of an image editing system to which an image processing apparatus according to an embodiment of the present disclosure is applied.

Hereinafter, an embodiment of the present disclosure will be described with reference to the figures. FIG. 1 is a diagram showing a schematic configuration of an image editing system 1 to which an image processing apparatus 10 according to the embodiment of the present disclosure is applied. The image editing system 1 shown in FIG. 1 is a system in which development treatment on RAW image data (corresponding to original image data) managed on a cloud can be requested from a terminal connected via a network.

As shown in FIG. 1, the image editing system 1 is configured by connecting the image processing apparatus 10, an image server 2, an image database 3, and a plurality of terminals 4 so as to be able to communicate with each other via a network 5.

Each device is a computer in which an application program that functions as a component of the image editing system 1 is installed. The application program is recorded in a recording medium, such as a digital versatile disc (DVD) or a compact disc read only memory (CD-ROM) and distributed, and is installed in the computer from the recording medium. Alternatively, the application program is stored in a storage device of a server computer connected to the network or in a network storage in a state in which the application program is accessible from the outside, and is downloaded and installed in the computer as necessary.

The image server 2 is a device in which a software program that provides a database management system (DBMS) function is installed in a general-purpose computer that has a relatively high processing capacity. Further, the image server 2 comprises a large-capacity storage in which the image database 3 is configured. This storage may be a large-capacity hard disk device connected to the image server 2 via a data bus, or may be a disk device connected to a network attached storage (NAS) and a storage area network (SAN) connected to network 5. Further, the image server 2 arranges the RAW image data received via the network 5 in a format for a database and registers the RAW image data in the image database 3.

In a case in which the image server 2 receives a viewing request from the image processing apparatus 10 via the network 5, the image server 2 searches for the RAW image data registered in the image database 3 and transmits the extracted RAW image data to the image processing apparatus 10 as a request source.

The image processing apparatus 10 and the image server 2 are connected to the terminal 4 via the network 5, such as the Internet, and appear to be present above the clouds from the terminal 4. Therefore, the image processing apparatus 10, the image server 2, and the like connected via the network 5 are called a cloud. In the present specification, in the following, the image processing apparatus 10 and the image server 2 will be referred to as the cloud.

The terminal 4 is a computer used by a user to request the development treatment on the RAW image data on the cloud, and includes a processing device, a display, and an input device, such as a keyboard and a mouse. In the terminal 4, each process, such as transmitting an image processing request including image processing-related information to the image processing apparatus 10 and acquiring the developed image data from the image processing apparatus 10 is performed by executing a software program for each process. Note that the terminal 4 is not limited to a computer, but may be a tablet, a smart phone, and the like.

The network 5 is the Internet line that connects various devices. Note that the network 5 may be a wired or wireless local area network or may be connected by a dedicated line.

In the following, the image processing apparatus 10 according to the present embodiment will be described in detail. The image processing apparatus 10 is a computer in which an image processing program of the present embodiment is installed. The computer can be, for example, the server computer connected to the terminal 4 used by the editor to edit the RAW image data via the network 5. The image processing program is recorded on the recording medium, such as the DVD, the CD-ROM, or the like and distributed, and is installed in the computer from the recording medium. Alternatively, the image processing program is stored in a storage device of a server computer connected to the network or in a network storage in a state in which the application program is accessible from the outside, and is downloaded and installed in the computer as necessary.

Figure 2:
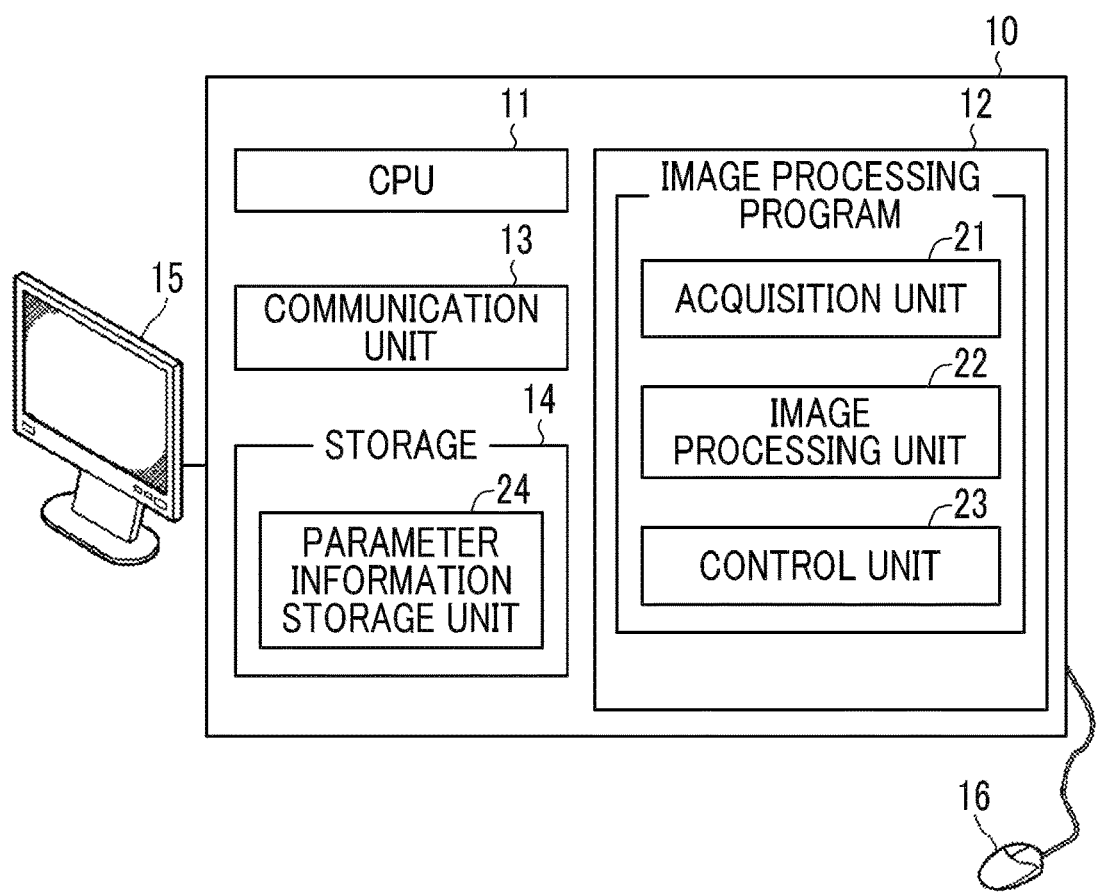
FIG. 2 is a diagram showing a schematic configuration of the image processing apparatus in the image editing system.

FIG. 2 is a diagram showing a schematic configuration of the image processing apparatus 10 according to the present embodiment of the present disclosure, which is realized by installing the image processing program in the computer. As shown in FIG. 2, the image processing apparatus 10 comprises a central processing unit (CPU) 11, a memory 12, and a storage 14, as a configuration of a standard workstation. Also, the image processing apparatus 10 is connected with a display 15, such as a liquid crystal display, and an input unit 16, such as a keyboard or a mouse.

The image processing program is stored in the memory 12. The image processing program defines, as the processes executed by the CPU 11, a step of performing communication with the terminal 4 via a communication unit 13, a step of acquiring the RAW image data, a step of, in a case in which the image processing request including the image processing-related information is received from the terminal 4, referring to parameter information indicating a relationship between the image processing-related information transmitted from the terminal 4 and an image processing parameter and performing the image processing on the RAW image data using the image processing parameter corresponding to the image processing-related information based on the parameter information, and a step of performing control of transmitting image data after the image processing to the terminal 4 via the communication unit 13. The CPU 11 executes the processes in accordance with the program, so that the computer functions as an acquisition unit 21, an image processing unit 22, and a control unit 23.

Note that in the present embodiment, the CPU 11 executes the function of each unit by the image processing program, but as a general-purpose processor that executes software and functions as various processing units, in addition to the CPU 11, a programmable logic device (PLD), which is a processor of which a circuit configuration can be changed after manufacturing, such as a field programmable gate array (FPGA) or the like, can be used. Also, the process of each unit may be executed by a dedicated electric circuit or the like, which is a processor having a circuit configuration specially designed to execute a specific process, such as an application specific integrated circuit (ASIC).

One processing unit may be configured by one of these various processors or may be configured by a combination of two or more processors of the same types or different types (for example, a plurality of the FPGAs or a combination of the CPU and the FPGA). In addition, a plurality of the processing units may be configured by one processor. As an example of configuring the plurality of processing units by one processor, first, as represented by a computer, such as a client and a server, there is a form in which one processor is configured by a combination of one or more CPUs and software and this processor functions as the plurality of processing units. Second, as represented by a system on chip (SoC), there is a form in which a processor is used in which the functions of the entire system including the plurality of processing units are realized by a single integrated circuit (IC) chip. As described above, the various processing units are configured by one or more of the various processors described above as a hardware structure.

Further, the hardware structures of these various processors are, more specifically, an electric circuit (circuitry) in which circuit elements, such as semiconductor elements, are combined.

A communication unit 13 realizes communication with an external apparatus via the network 5. The communication unit 13 comprises at least one of a wired communication unit or a wireless communication unit. The wired communication unit comprises, for example, a wired communication module configured by an electric circuit that performs wired communication and a jack that connects a wired cable. The wireless communication unit comprises, for example, a wireless communication module configured by an electric circuit that performs wireless communication and an antenna that transmits and receives radio waves.

The storage 14 comprises the storage device, such as a hard disk, a solid state drive (SSD), or the like. The storage 14 functions as a parameter information storage unit 24 that stores the parameter information indicating the relationship between the image processing-related information transmitted from the terminal 4 and the image processing parameter.

[Regarding Parameter Information]

Hereinafter, the parameter information stored in the parameter information storage unit 24 will be described. FIG. 3 is an explanatory diagram of the parameter information.

The image processing-related information is information that can be designated with a smaller number of operations than the number of operations in a case in which all the image processing parameters required at the time of development are individually designated. In the image editing system 1 according to the present embodiment, the image processing-related information includes terminal information which is information regarding the terminal, use information which is information regarding a use of an image, and setting information regarding the image processing.

As shown in FIG. 3, the parameter information is a three-dimensional table showing a unique relationship between the terminal information, the use information, and the setting information and the image processing parameter. The image processing parameter includes a basic development parameter with respect to the RAW image data and an image processing parameter for adjusting an image size, a tone, a sharpness, and the like.

Here, the terminal information is information regarding a characteristic that affects a case in which the image data is handled in the terminal 4. FIG. 3 shows, as an example, a combination example of a display resolution, a gradation (here, standard dynamic range (SDR) or high dynamic range (HDR)), and an international color consortium (ICC) profile of the display provided in the terminal 4.

Further, the use information is information regarding the use of the image data acquired by the terminal 4. FIG. 3 shows an example in which the use can be selected from any one of for terminal display, for poster printing, for a photo book, or for Web posting.

Further, the setting information is information regarding a rough setting of the contents of the image processing. FIG. 3 shows, as an example, a case in which the setting can be selected from any one of "normal" setting in which the tone of the image is the standard tone, "vivid" setting in which the tone of the image is made to a more vivid tone than in the "normal" setting, or "pale" setting in which the tone of the image is made to a lighter tone than in the "normal" setting.

In a case in which the image processing-related information including the terminal information, the use information, and the setting information are received from the terminal 4, the image processing apparatus 10 can refer to the parameter information to uniquely decide the image processing parameter in a case in which the image processing is performed.

[Process Flow]

Figure 4:
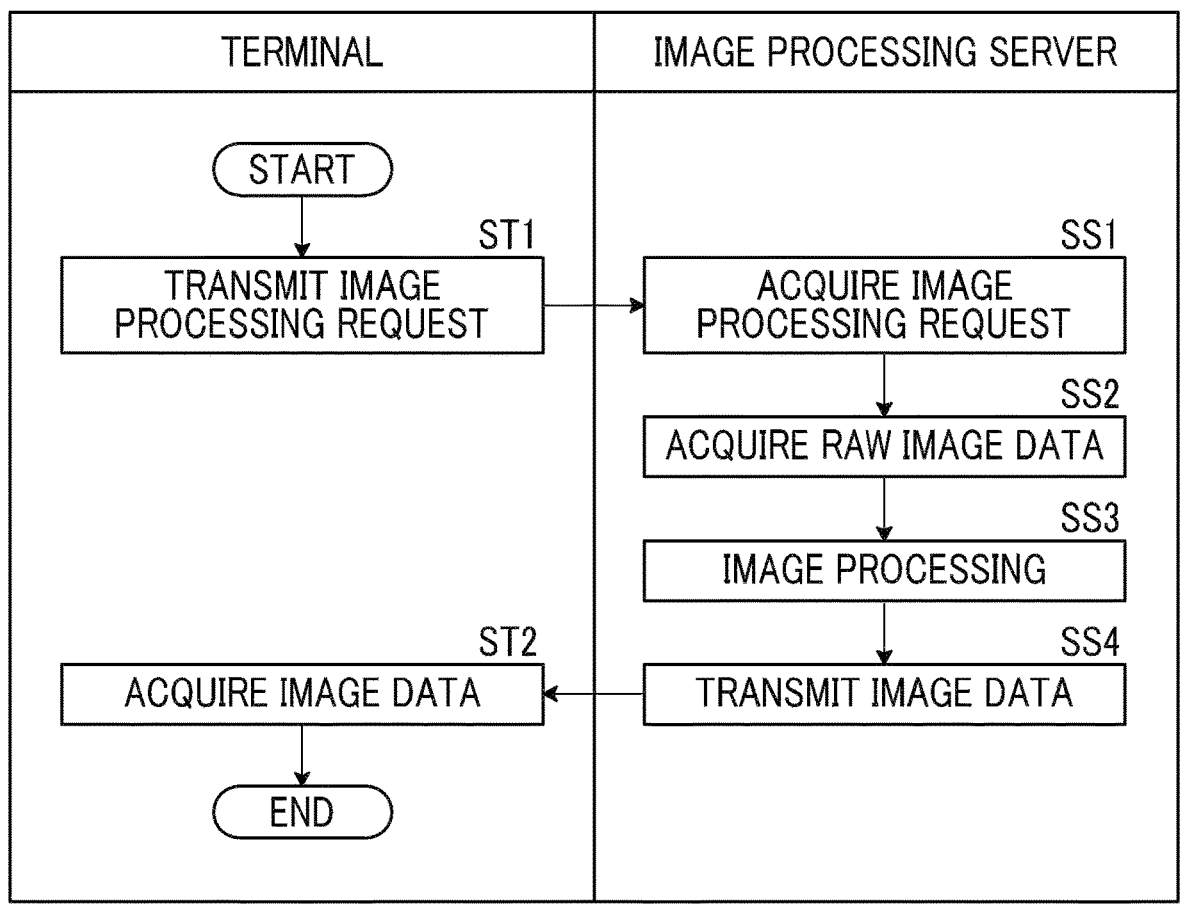
FIG. 4 is a flowchart describing a process flow at the time of image processing in the image editing system.

Next, a process performed in the present embodiment will be described. FIG. 4 is a flowchart describing a process flow at the time of the image processing in the image editing system 1.

In a case in which the user inputs a development instruction of the RAW image data via a development application activated in the terminal 4, the terminal 4 transmits the image processing request including the image processing-related information to the image processing apparatus 10 (step ST1).

Here, the image processing-related information includes the terminal information, the use information, and the setting information. The terminal information is the combination example of the display resolution, the gradation (here, SDR or HDR), and the ICC profile of the display provided in the terminal 4. These pieces of information are the hardware characteristic of the display provided in the terminal 4, and the terminal 4 acquires this pieces of information in advance and stores the acquired information. Further, the use information is selected from any one of for terminal display, for poster printing, for a photo book, or for Web posting and is input by the user at the time of the development instruction input. Further, the setting information is selected from any one of the "normal" setting, the "vivid" setting, or the "pale" setting for the tone of the image and is input by the user at the time of the development instruction input.

In a case in which the image processing apparatus 10 acquires the image processing request including the image processing-related information from the terminal 4 (step SS1), the acquisition unit 21 acquires the RAW image data from the image server 2 (step SS2). Next, the image processing unit 22 refers to the parameter information stored in the parameter information storage unit 24, acquires the image processing parameter corresponding to the image processing-related information (here, the terminal information, the use information, and the setting information), and performs the image processing on the RAW image data (step SS3). The control unit 23 transmits the image data obtained as a result of the image processing to the terminal 4 (step SS4).

The terminal 4 acquires the image data after the image processing from the image processing apparatus 10 (step ST2), and the process is terminated.

[Operation and Effect]

The image processing apparatus 10 according to the present embodiment can store in advance the parameter information indicating the relationship between the image processing-related information including the terminal information, the use information, and the setting information, and the image processing parameter in the parameter information storage unit 24, and uniquely decide the image processing parameter based on the image processing-related information acquired from the terminal 4.

In a case in which the user inputs the development instruction, only the use information and the setting information are selected and input, so that the image processing apparatus 10 can provide the optimum image in consideration of the display characteristic of the display of the terminal 4, the use of the image, and the desired tone of the image.

Therefore, the user does not need to set the image processing parameter in detail in consideration of the display characteristic of the display provided in the terminal 4, the use of the image, and the like, and the user can request development with a simple operation with respect to the image processing apparatus 10.

Modification Example

Although the present disclosure has been described above based on the preferred embodiment thereof, embodiments to which the present disclosure can be applied are not limited to the embodiments described above.

For example, the original image data handled by the image processing apparatus according to the present disclosure is not limited to the RAW image data, and may be any image data, such as high resolution rendering image data.

Further, the image processing-related information is not limited to the aspect including all of the terminal information, the use information, and the setting information, and may be only one or two of these pieces of information. Further, the image processing-related information may be information other than the terminal information, the use information, and the setting information.

It is needless to say that the present disclosure can be modified as appropriate without departing from the gist of the present disclosure in addition to the above. Also, the presently disclosed technology extends to a storage medium that non-temporarily stores the program, in addition to the program.

The disclosure of JP2019-064785A filed on Mar. 28, 2019 is incorporated in the present specification by reference in its entirety. All documents, patent applications, and technical standards described in the present specification are incorporated in the present specification by reference to the same extent as a case in which individual document, patent application, and technical standard are specifically and individually noted to be incorporated by reference.

What is claimed is:

1. An image processing apparatus that performs image processing on original image data, the apparatus comprising:
 a communication transceiver that performs communication with a terminal;
 a memory that stores parameter information indicating a relationship between image processing-related information that includes terminal information which is information regarding the terminal transmitted from the terminal and an image processing parameter; and
 a processor,
 wherein the processor
  acquires the original image data from an image server that communicates with the image processing apparatus via the communication transceiver,
  performs the image processing on the original image data using the image processing parameter corresponding to the image processing-related information based on the parameter information, and
  transmits image data after the image processing to the terminal via the communication transceiver.

2. The image processing apparatus according to claim 1, wherein the image processing-related information includes use information which is information regarding a use of an image.

3. The image processing apparatus according to claim 1, wherein the image processing-related information includes setting information regarding the image processing.

4. The image processing apparatus according to claim 1, wherein the original image data is RAW image data, and the image processing performed by the processor includes development treatment on the RAW image data.

5. An image processing method of performing image processing on original image data, the method comprising:
 performing, by a communication transceiver of an image processing apparatus, communication with a terminal;
 acquiring the original image data from an image server that communicates with the image processing apparatus via the communication transceiver;
 referring to parameter information indicating a relationship between an image processing-related information transmitted from the terminal and an image processing parameter and performing the image processing on the original image data using the image processing parameter corresponding to the image processing-related information based on the parameter information, wherein the image processing-related information includes terminal information which is information regarding the terminal; and
 performing control of transmitting image data after the image processing to the terminal via the communication transceiver.

6. A non-transitory computer-readable storage medium storing an image processing program of performing image processing on original image data, the program causing a computer to execute:
 performing communication with a terminal;
 acquiring the original image data from an image server that communicates with the computer via a communication transceiver of the computer;
 referring to parameter information indicating a relationship between an image processing-related information transmitted from the terminal and an image processing parameter and performing the image processing on the original image data using the image processing parameter corresponding to the image processing-related information based on the parameter information, wherein the image processing-related information includes terminal information which is information regarding the terminal; and
 performing control of transmitting image data after the image processing to the terminal via the communication transceiver.

* * * * *